US009596669B2

(12) United States Patent
Kelleher et al.

(10) Patent No.: US 9,596,669 B2
(45) Date of Patent: *Mar. 14, 2017

(54) METHOD AND APPARATUS FOR TRANSMITTING DATA

(71) Applicant: FREESCALE SEMICONDUCTOR, INC., Austin, TX (US)

(72) Inventors: Paul Kelleher, Aherla (IE); Michael O'Brien, Youghal (IE); Conor O'Keeffe, Passage West (IE)

(73) Assignee: NXP USA, INC., Austin, TX (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/171,921

(22) Filed: Feb. 4, 2014

(65) Prior Publication Data
US 2014/0153590 A1 Jun. 5, 2014

Related U.S. Application Data

(63) Continuation of application No. 13/061,626, filed as application No. PCT/IB2008/053605 on Sep. 5, 2008, now Pat. No. 8,675,685.

(51) Int. Cl.
*H04J 3/24* (2006.01)
*H04W 56/00* (2009.01)
*H04B 1/40* (2015.01)
*H04B 15/02* (2006.01)

(52) U.S. Cl.
CPC .......... *H04W 56/0045* (2013.01); *H04B 1/40* (2013.01); *H04B 15/02* (2013.01); *H04B 2215/067* (2013.01)

(58) Field of Classification Search
CPC .............. H04L 61/2092; H04L 1/0028; H04L 29/06163; H04L 1/0001
See application file for complete search history.

(56) References Cited

U.S. PATENT DOCUMENTS

| 3,996,553 A | 12/1976 | Siems et al. | |
| 4,694,467 A * | 9/1987 | Mui | 375/144 |
| 4,792,800 A * | 12/1988 | Fujioka | H04Q 11/0471 340/2.8 |

(Continued)

FOREIGN PATENT DOCUMENTS

| FR | 2666157 A1 * | 2/1992 | ............ G04G 13/00 |
| WO | 2008080634 A | 7/2008 | |

OTHER PUBLICATIONS

Fogg, A.: "DigRF Baseband/RF Digital Interface Specification: Logical, Electrical and Timing Characteristics," EGPRS Version, Digital Interface Working Group, v. 1.12; Internet Citation, [Online] Feb. 20, 2004, XP002325710; Retrieved from the Internet: URL: <<http://146.101.169.51/DigRF%20Standard %20v112.pdf>> 32 pages.

(Continued)

*Primary Examiner* — Hassan Phillips
*Assistant Examiner* — Siren Wei

(57) ABSTRACT

A semiconductor device comprising interface logic for transmitting data bursts across an interface. The interface logic is arranged to transmit bursts of data across the interface such that the start of a burst of data is substantially aligned with a symbol interval (SI) boundary. The interface logic is further arranged to apply an offset to the SI boundary at the start of the burst of data.

17 Claims, 6 Drawing Sheets

(56) References Cited

U.S. PATENT DOCUMENTS

| | | | | |
|---|---|---|---|---|
| 5,625,882 A | * | 4/1997 | Vook | H04B 1/1615 |
| | | | | 340/7.34 |
| 6,377,782 B1 | | 4/2002 | Bishop et al. | |
| 6,463,266 B1 | | 10/2002 | Shohara | |
| 6,898,205 B1 | * | 5/2005 | Chaskar | H04Q 11/0066 |
| | | | | 370/450 |
| 7,274,908 B1 | * | 9/2007 | Boone | H04B 7/18513 |
| | | | | 370/509 |
| 7,548,623 B2 | | 6/2009 | Manabe | |
| 2002/0008633 A1 | * | 1/2002 | Heller | G06K 7/0008 |
| | | | | 340/9.17 |
| 2002/0183042 A1 | | 12/2002 | Thornton | |
| 2003/0054785 A1 | | 3/2003 | Tobergte et al. | |
| 2003/0223521 A1 | | 12/2003 | Astrachan | |
| 2005/0028020 A1 | * | 2/2005 | Zarrieff et al. | 713/600 |
| 2005/0122936 A1 | | 6/2005 | Son et al. | |
| 2006/0059280 A1 | | 3/2006 | Gossmann et al. | |
| 2006/0126553 A1 | * | 6/2006 | Lim | H04L 1/1893 |
| | | | | 370/321 |
| 2007/0054680 A1 | * | 3/2007 | Mo | H04B 1/71632 |
| | | | | 455/502 |
| 2007/0201423 A1 | * | 8/2007 | Laroia | H04L 5/0035 |
| | | | | 370/345 |
| 2007/0276955 A1 | * | 11/2007 | Edsberg | H04B 7/18582 |
| | | | | 709/237 |

OTHER PUBLICATIONS

International Search Report for International Application No. PCT/IB2008/053605 mailed Jun. 9, 2009, 2 pages.

* cited by examiner

METHOD AND APPARATUS FOR TRANSMITTING DATA

CROSS-REFERENCE TO RELATED APPLICATION(S)

This application is a continuation of U.S. patent application Ser. No. 13/061,626, entitled "Method and Apparatus for Transmitting Data," filed on Mar. 1, 2011, which is a National Stage Entry under 37 C.F.R. §371 of PCT/IB2008/053605, filed Sep. 5, 2008, the disclosures of which are hereby expressly incorporated by reference in their entirety.

FIELD OF THE DISCLOSURE

The field of this invention relates to a method and apparatus for transmitting data, and more particularly to a method and apparatus for transmitting data across an interface.

BACKGROUND

High Speed serial interfaces straddle many standardisation efforts; these include the DigRF/M-PHY interface developed by the MIPI (Mobile Industry Processor Interface) Alliance, Universal Serial Bus (USB) interface, serial Rapid Input Output (sRIO) bus interface, Common Public Radio Interface (CPRI), Open Base Station Architecture Initiative (OBSAI) interfaces, etc. Key requirements for such high speed interfaces include: high baud rates with minimal power consumption, low bit error rate and minimal EMI (Electromagnetic Interference) emissions. Many electronic products that include high-speed serial interfaces also contain wireless functionality. A mobile telephone device is one such example of an electronic product that includes high-speed serial interfaces.

The MIPI developed M-PHY interface configured in DigRF mode is a high speed interface comprising requirements for EMI that are particularly acute due to the fact that the interface is connecting the Radio Frequency (RF) integrated circuit (RFIC) transceiver device and the baseband integrated circuit (BBIC) processor in a communication device, and utilises data rates corresponding to the frequencies of cellular bands on radio platforms. The proliferation of embedded clock schemes, such as 8b/10b encoding in serial interfaces to facilitate clock data recovery, has an undesired consequence of shaping the resultant EMI spectrum.

Repetitive patterns in data transmissions cause EMI power to be concentrated in discrete frequencies. Such frequency spur generation in the EMI profile of an interface can impair cellular reception, if it occurs at frequencies corresponding to those of cellular bands on radio platforms. In the MIPI M-PHY/DigRF standard, an encoded frame consists of a synchronisation pattern, a start of frame section, a header section, a payload section and an end of frame section. Accordingly, consecutive frames comprise a significant amount of repetition. Furthermore, due to the 8b/10b encoding scheme employed, all the symbols are transmitted on a 10 UI (Unit Interval) boundary. Since most interfaces tend to be synchronous machines, there will typically be a repetitive fixed integer SI (Symbol Interval) boundary between successive frames, exacerbating the problem of repetitiveness.

SUMMARY

The present invention provides a semiconductor device, a wireless communication device and a method for transmitting data across an interface as described in the accompanying claims.

Specific embodiments of the invention are set forth in the dependent claims.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE DRAWINGS

Figure 1:
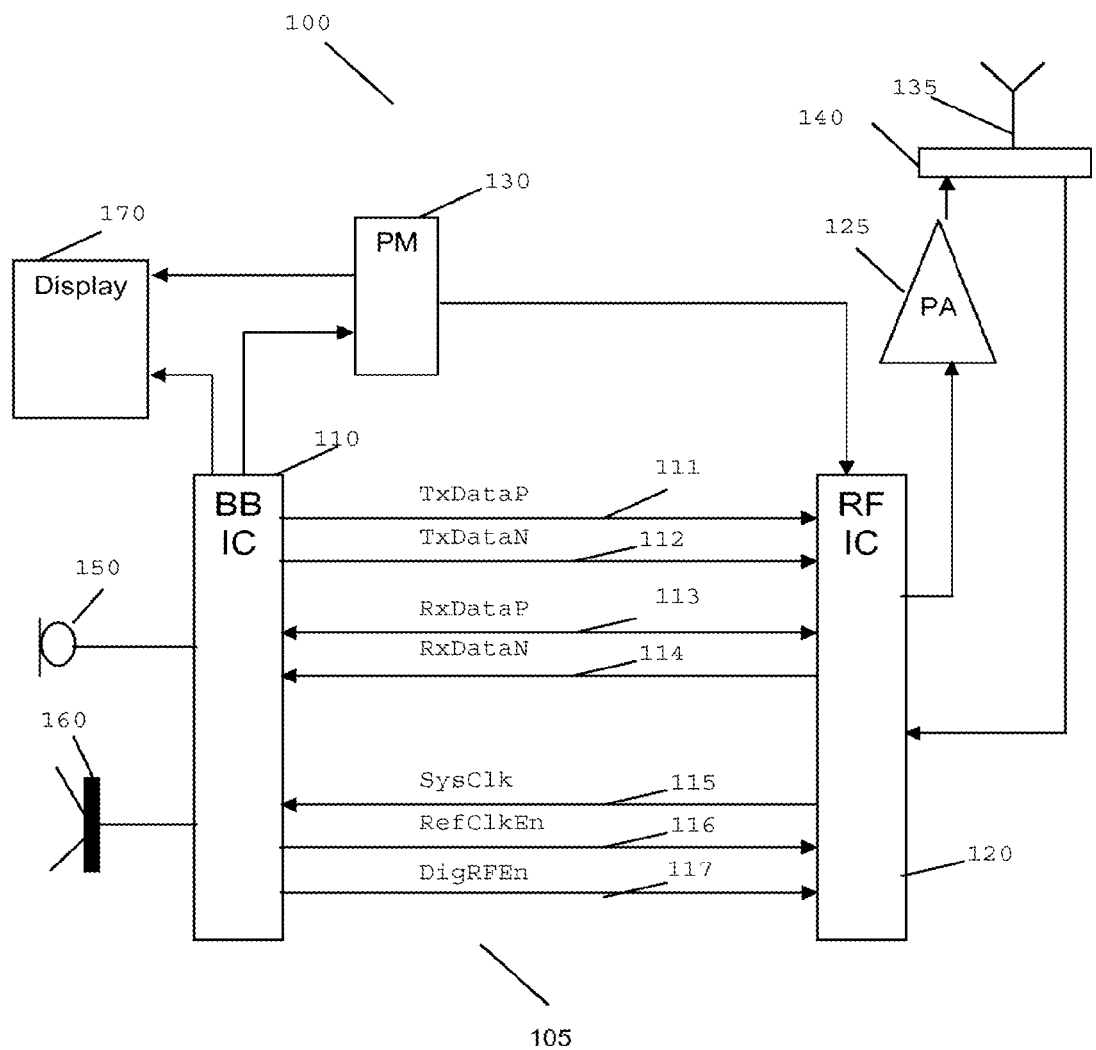
FIG. 1 illustrates a simplified block diagram of part of an example of a wireless communication device.

Referring first to FIG. 1, there is shown a simplified block diagram of part of an example of a wireless communication device 100. The wireless communication device 100 may be a multimode 3.sup.rd generation (3G) mobile telephone. As such, the wireless communication device 100 may comprise an antenna 135, coupled to a 3G duplex filter or antenna switch 140, which provides isolation between receive and transmit chains within the wireless communication device 100. The receiver chain, as known in the art, may include numerous receiver circuitries, such as receiver front-end circuitry effectively providing reception, filtering and intermediate or base-band frequency conversion (not shown). The receiver circuitry may be predominantly formed on a radio frequency integrated circuit (RFIC) 120. The RFIC 120 may be coupled to a number of other elements/functions (not shown) such as signal processing logic, memory elements, etc.

As known in the art, the RFIC 120 is operably coupled to a baseband integrated circuit (BBIC) 110 that performs a number of signal processing operations at baseband frequencies, such as decoding/encoding, (de)modulation, (de)interleaving functions and the like. The BBIC 110 may be coupled to a number of other logic elements/functions (not shown), such as signal processing logic, memory elements, etc. The BBIC 110 may comprise a timer or clock function (not shown), or may be operably coupled to an external timer or clock, to control a timing of operations (transmission or reception of time-dependent signals) within the wireless communication device 100.

The coupling between the RFIC 120 and the BBIC 110 may be implemented via a RFIC-BBIC data interface 105, such as a fourth generation (4G) DigRef interface, which for the illustrated embodiment comprises seven pins to carry electrical signals there between. The seven pins may comprise a differential TX path (TxDataP line 111, TxDataN line 112), differential RX path (RxDataP line 113, RxDataN line 114); single ended reference clock (SysClk) line 115, a single ended system clock enable (RefClkEn) line 116 and a single ended interface enable (DigRFEn) line 117. For some classes of current/future mobile communication applications, such as Long Term Evolution (LTE), additional paths between RFIC and BBIC may be added to carry the required data payload between ICs.

It is envisaged that the BBIC 110 may be operably coupled to a plurality of RFICs 120 (not shown). The BBIC may also be coupled to one or more output devices, such as audio speaker 160 and/or display 170.

As regards the transmit chain of the wireless communication device 100, this includes an input device, such as a microphone 150 and/or keypad (not shown), coupled to the BBIC 110. The RFIC 120, when operating in a transmit function, may be coupled to a radio frequency power amplifier 125 and thereafter to the antenna 135 via the antenna switch or duplex filter 140. A voltage regulator (not shown) associated with the RFIC 120 may form part of a power management unit 130, with the BBIC 110 maintaining control of the power management unit 130.

The BBIC-RFIC interface, and therefore the BBIC and RFIC devices, may for example be adapted to function using improved sampling logic, as described below.

Figure 2:
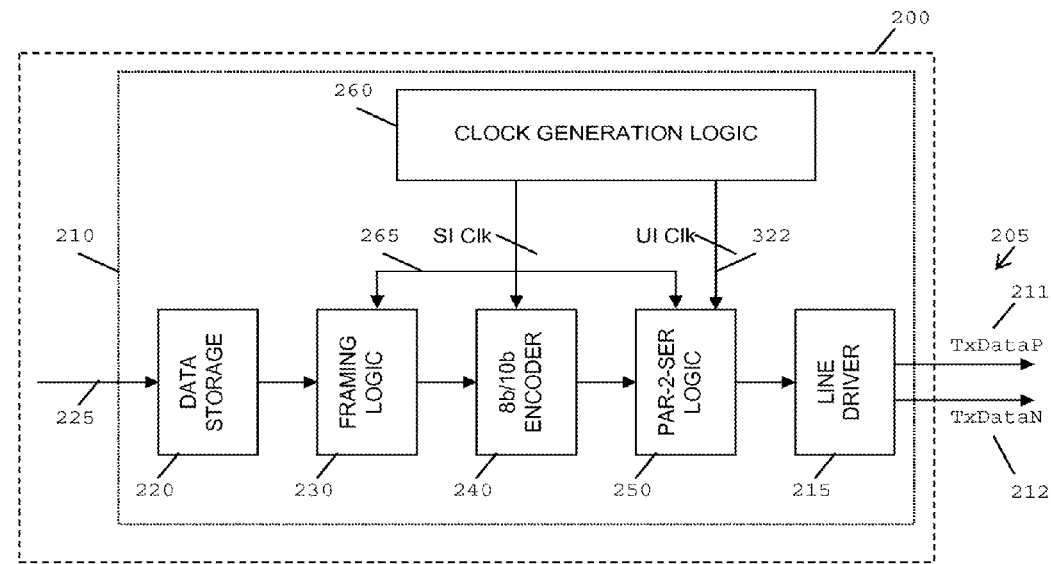
FIG. 2 illustrates a block diagram of an example of a semiconductor device.

Referring now to FIG. 2, a block diagram of an example of a semiconductor device 200, is illustrated. By way of example, the semiconductor device may comprise the BBIC 110 or RFIC 120 of FIG. 2. The semiconductor device 200 comprises interface logic 210 for transmitting data burst across an interface 205. The interface logic 210 is arranged to transmit bursts of data across the interface 205 such that the start of a burst of data is substantially aligned with a symbol interval (SI) boundary.

As previously mentioned, repetitive patterns in data transmissions generate EMI (Electromagnetic Interference) power to be concentrated in discrete frequencies. Such frequency spur generation in the EMI profile of an interface can impair cellular reception, if it occurs at frequencies corresponding to those of cellular bands on radio platforms. Furthermore, the repetitive nature of the structure of data frames, along with the use of encoding schemes such as 8b/10b encoding resulting in symbols being transmitted on repetitive fixed integer symbol interval (SI) boundaries between successive frames, exacerbates the problem of frequency spur generation in the EMI profile.

Accordingly, the interface logic 210 is further arranged to apply an offset to the SI boundary at the start of the burst of data. In this manner, SI boundaries in successive bursts of data may be offset relative to one another. As a result, the repetitiveness of successive bursts may be substantially interrupted from one burst to the next burst, significantly reducing the occurrence of frequency spurs at cellular bands within the EMI profile.

In an example, the offset applied to the SI boundary at the start of each burst of data may be varied for each successive burst of data. For example, the interface logic 210 may be arranged to apply a substantially random offset to the SI boundary at the start of each burst of data. Alternatively, the interface logic 210 may be arranged to apply an offset to the SI boundary at the start of a burst of data in accordance with an offset sequence. For example, a randomly generated offset is arranged to not be equal to the SI boundary. By way of example, a generally optimum sequence of offsets may be determined through simulations or otherwise for minimising the affect of EMI on cellular bands. This sequence may be stored in an area of memory (not shown), and used to sequentially apply offsets to consecutive bursts of data.

For the example illustrated in FIG. 2, the interface logic 210 comprises data storage element 220, for example in a form of a dual port First In First Out (FIFO) Random Access Memory (RAM) element, arranged to receive and store data 225 to be transmitted across the interface 205. The data storage element 220 is operably coupled to framing logic 230, which is arranged to receive data to be transmitted across the interface 205 from the data storage element 220, and to convert the data into data frames. The framing logic 230 is operably coupled to an encoder, which for the illustrated embodiment is in a form of an 8b/10b encoder, which receives each data frame from the framing logic 230, and performs 8b/10b encoding on the data frames. The result of the 8b/10b encoding is a sequence of encoded data symbols comprising a symbol interval (SI) of 10 unit intervals (UIs). The encoded data symbols are then provided to parallel-to-serial (PAR-2-SER) logic 250, which generates a serial data burst comprising a synchronisation pattern, a start of frame section, a payload section comprising encoded data frame, and an end of frame section. The data burst is then provided to a line driver 215, which transmits the data burst over the interface 205, which for the illustrated embodiment comprises a differential transmit path (TxDataP line 211, TxDataN line 212).

The interface logic 210 further comprises timing logic in a form of clock generation logic 260. The timing logic 260 is arranged to generate an SI timing signal 265 in accordance with which the transmission of each burst of data is substantially aligned. Thus, for the illustrated embodiment, the SI timing signal 265 is provided to each of the framing logic 230, encoding logic 240 and parallel-to-serial logic 250, such that each of these logic elements is substantially synchronised to the SI timing signal 265. The parallel-to-serial logic 250 is further provided with a UI timing signal 322, with which the provision of individual data units (e.g. bits) to the line driver 215 is synchronised. The timing logic 260 is further arranged to apply an offset to the SI timing signal 265 at the start of a burst of data, thereby offsetting the SI boundary at the start of the burst of data.

As will be appreciated, the interface logic 210 may be arranged to enter one of either a 'sleep mode' or a 'stall mode' between the transmissions of data bursts. Whilst in practice such modes are considered distinct from one another, for the purpose of clarity, the term 'stall' used herein, including such use in the claims, is to be considered synonymous with the term 'sleep' and vice versa.

Figure 3:
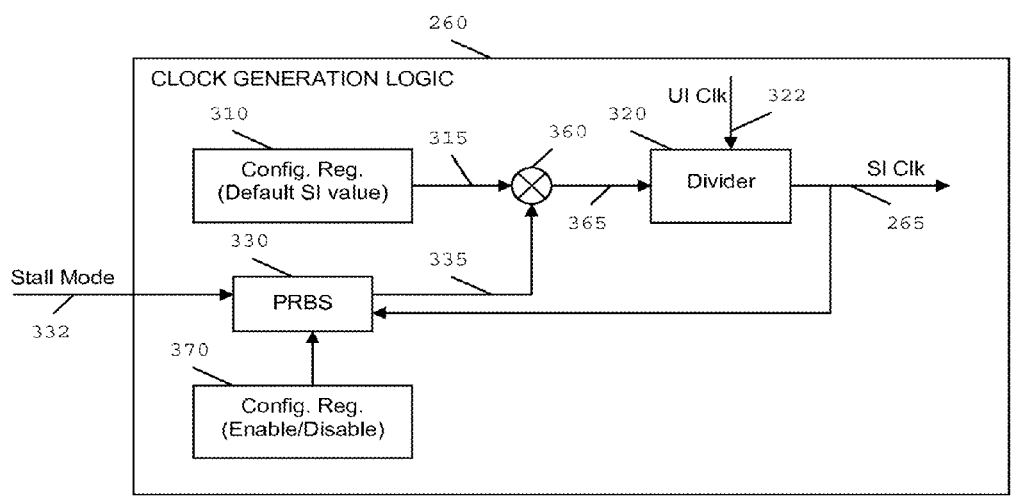
FIG. 3 illustrates a block diagram of part of timing logic of the example of FIG. 2.

FIG. 3 illustrates an example of a block diagram of part of the timing logic 260 of FIG. 2. The timing logic 260 comprises divider logic 320 arranged to receive a UI timing signal 322. The divider logic 320 is further arranged to receive an SI value 365 and to divide the UI timing signal 322 by the received SI value 365 to generate the SI timing signal 265. The timing logic 260 further comprises offset generation logic 330 arranged to generate an offset value 335, which is applied at 360 to a default SI value 315. For example, in the case of 8b/10b encoding, where encoded data symbols comprise a symbol interval (SI) of 10 unit intervals (UIs), the default SI value 315 may comprise a value of '10'. For the illustrated embodiment, the timing logic 260 comprises a configurable register 310, within which the default SI value 315 is stored. In this manner, the default SI value may be configured as required.

As previously mentioned, the interface logic 210 may be arranged to apply a substantially random offset to the SI boundary at the start of each burst of data. Accordingly, for the illustrated embodiment, the offset generation logic 330 comprises a Pseudo Random Binary Sequence generator, which generates a pseudo random offset value 335. However, the offset generation logic 330 may be arranged to generate the offset value 335 in accordance with a predetermined offset sequence stored in an area of memory (not shown), and used to sequentially apply offsets to consecutive bursts of data.

For the illustrated embodiment, the offset generation logic 330 is arranged to receive a stall mode signal 332. In this manner, when the interface logic 210 exits a stall mode, for example when a new data burst is to be transmitted across the interface 205, the offset generation logic 330 may be initialised into generating an offset value 335 for the data burst. For example, where the default SI value 315 equals '10', the offset value 335 may comprise a value range from '0' to '9'. This offset value is applied to the default SI value 315 (for example subtracted from the default SI value 315) at 360 to create offset SI value 265. The divider logic 320 then divides the UI timing signal 322 by the received SI value 365 to generate the SI timing signal 265 comprising the offset SI boundary. The offset generation logic 330 is further arranged to receive the SI timing signal 265. In this manner, offset generation logic 330 is able to detect when the offset SI boundary has been output by the divider 320, and upon detection of the offset SI boundary, the offset generation logic 330 may reset the offset value 335. In this manner, once the offset SI boundary has been output by the divider logic 320, the offset is removed from the default SI value 315. As a result, subsequent SI boundaries will occur at non-offset intervals, as required in order to permit correct transmission of the data burst across the interface.

It is envisaged that the timing logic 260 may further comprise a configurable enable/disable register 370 operably coupled to the offset generation logic 330. In this manner, the offset generation logic may be enabled or disable, depending on a value stored in the register 370. This, offsetting of the SI boundary at the start of a burst of data may be configurably enabled or disabled.

Figure 4:
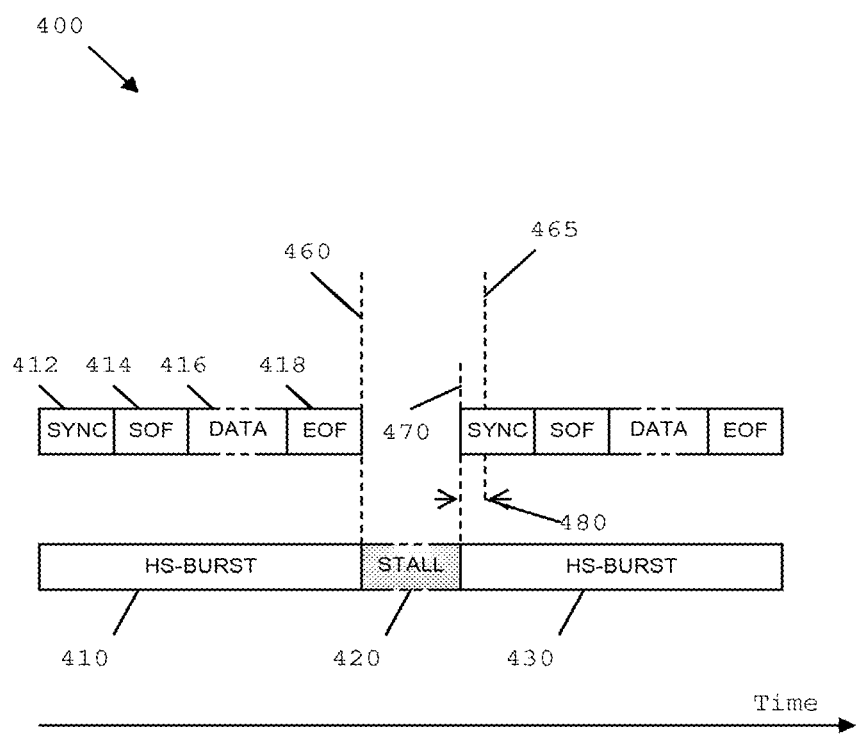
FIG. 4 illustrates an example of timing diagram adapted according to embodiments of the present invention.

Referring now to FIG. 4, there is illustrated an example of a timing diagram 400. The timing diagram 400 illustrates the transmission of data bursts 410, 430 across an interface. A first data burst 410, comprising a synchronisation pattern 412, start of frame section 414, encoded data frame 416 and end of frame section 418 is transmitted across the interface, with the end of the data burst, for example the end of frame section 418, substantially aligned with an SI boundary 460. A stall mode 420 is illustrated between the two data bursts 410, 430. A default SI boundary 465 is illustrated, to which the subsequent data burst 430 would traditionally be aligned. However, for the illustrated embodiment, an offset 480 is applied to the SI boundary at the start of the second data burst 430. As a result, the SI boundary 470 with which the start of the second data burst 430 is aligned is offset, resulting in a misalignment between the SI boundaries for the respective data bursts 410, 430. As a result, the subsequent SI boundaries throughout the second data burst 430 will be offset with respect to those of the first data burst. Thus, the EMI profile caused by the repetitive nature of the SI boundaries is altered. In particular, by offsetting the SI boundary for successive data bursts relative to one another, the EMI profile caused by SI boundaries can be sufficiently modified to reduce frequency spurs appearing in cellular bands.

For the illustrated embodiment, the offset 480 applied to the SI boundary at the start of the second data burst 430 results in the offset SI being shorter in duration than a default SI. However, an offset applied to the SI boundary may equally, in an alternative example, result in the SI being longer in duration that a default SI.

The interface logic 210 may be arranged to apply an offset of (+/−N*UI) to the SI boundary at the start of the burst of data, where UI equals a unit interval, and N equals (K−1), where K equals the number of unit intervals in one symbol interval. For example, in the case where the symbol interval (SI) is equal to ten unit intervals (UIs), the amount by which SI boundaries are offset at the start of data bursts may be configured to be spread over a +/−10 UI range (e.g. 0 to 9 times UI), which has been found to reduce the effect of EMI caused by SI boundaries by greater than 5 dB. Indeed, even spreading the range of offsets over just two UIs (e.g. +/−1 UI) showed significant benefit in simulations.

Advantageously, known architectures for a receiving side (not shown) of the interface 205 are able to use known clock and data recovery (CDR) techniques to compensate for SI offsets. For example, as is known, each data burst comprises a synchronisation pattern at the start thereof, with which the receiving architecture is able to synchronise with the data burst, and thereby compensate for any SI offset applied.

Figure 5:
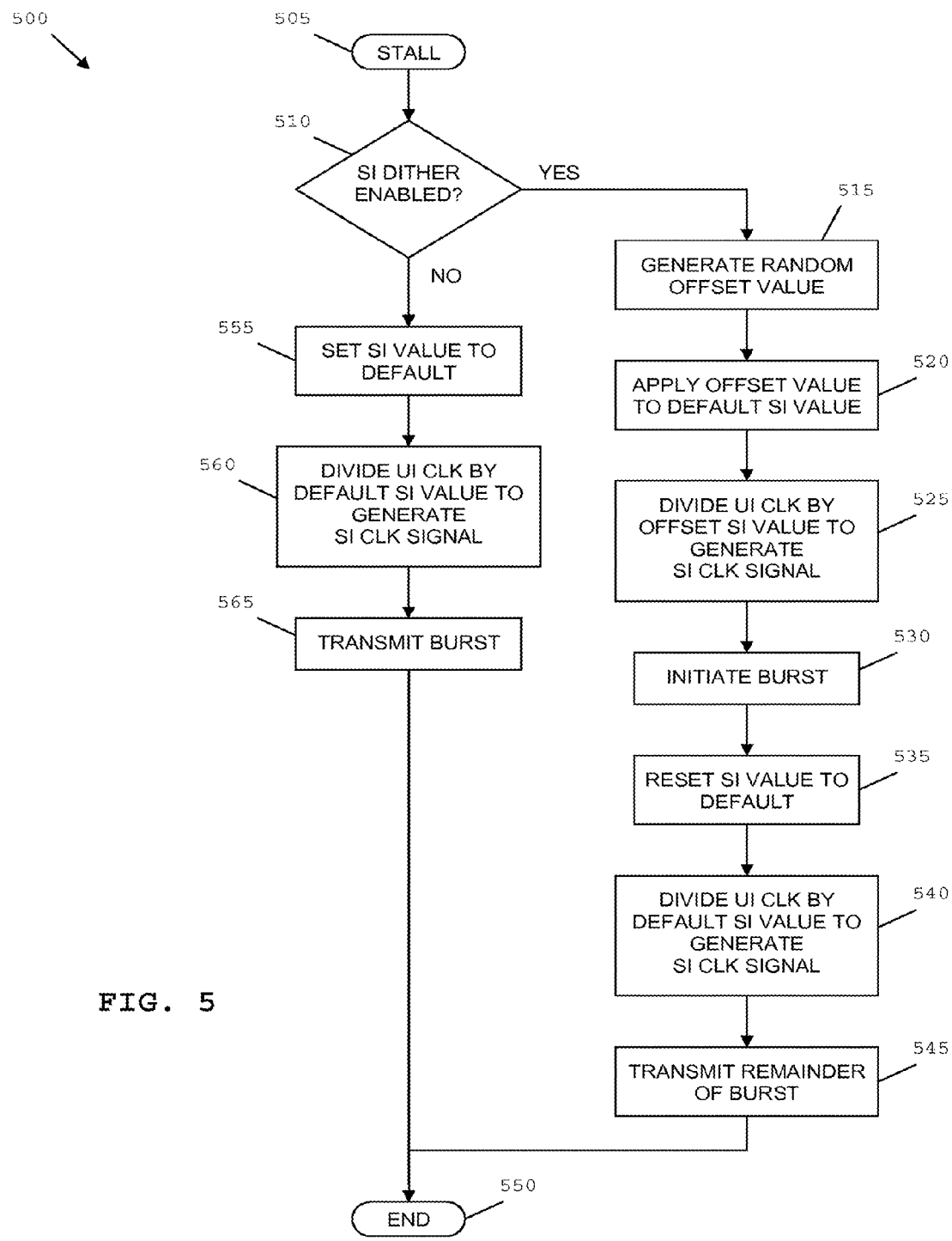
FIG. 5 illustrates a simplified flowchart of an example of a method for transmitting a burst of data across an interface.

Referring now to FIG. 5, there is illustrated an example of a simplified flowchart 500 of a method for transmitting a burst of data across an interface. The method starts at step 505 with a stall (or sleep) mode between a previous data burst and the burst of data to be transmitted across the interface. Next, in step 510, it is determined whether symbol interval (SI) dithering is enabled.

If SI dithering is enabled, the method moves to step 515, where an offset value is generated. For the illustrated embodiment, a substantially random offset value is generated. However, an offset value corresponding to a predetermined offset sequence may alternatively be generated. The generated offset value is then applied to a default SI value in step 520. A unit interval (UI) timing signal is then divided by the offset SI value, in step 525, to generate an offset SI timing signal. Next, in step 530, transmission of the data burst is initiated, with the start of the data burst being substantially aligned to the offset SI timing signal. Next, in step 535, the SI value is reset to the default SI value, and the UI timing signal is then divided by the default SI value in step 540 to remove the offset from the SI timing signal in step 540. In this manner, subsequent SI boundaries will occur at non-offset intervals, as required in order to permit correct transmission of the data burst across the interface. The remainder of the data burst is then transmitted in step 545, and the method ends at step 550.

Referring back to step 510, if SI dithering is not enabled, the method moves to step 555, where the SI value is set to a default value. Next, in step 560, the UI timing signal is divided by the default SI value to generate a default SI timing signal. The data burst is then transmitted in step 565, and the method ends at step 550.

Figure 6:
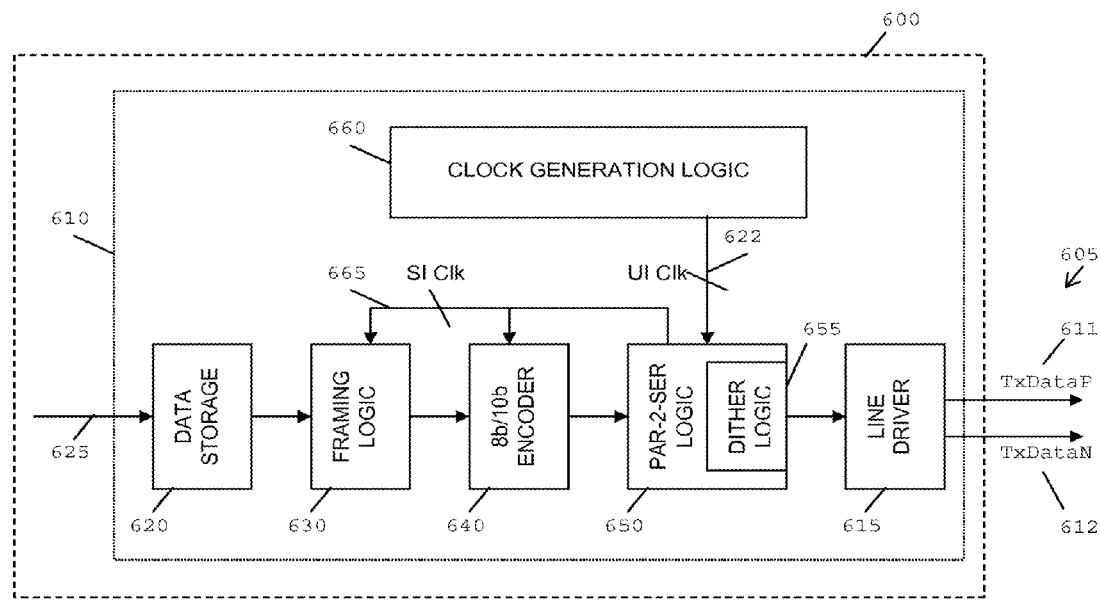
FIG. 6 illustrates a block diagram of an example of a semiconductor device.

Referring now to FIG. 6, there is illustrated a block diagram of an example of a semiconductor device 600. The semiconductor device 600 comprises interface logic 610 for transmitting data burst across an interface 605. The interface logic 610 is arranged to transmit bursts of data across the interface 605 such that the start of a burst of data is substantially aligned with a symbol interval (SI) boundary.

The interface logic 610 is further arranged to apply an offset to the SI boundary at the start of the burst of data.

For the example illustrated in FIG. 6, the interface logic 610 comprises data storage element 620, for example in the form of a dual port FIFO RAM element, arranged to receive and store data 625 to be transmitted across the interface 605. The data storage element 620 is operably coupled to framing logic 630, which is arranged to receive data to be transmitted across the interface 605 from the data storage element 620, and to convert the data into data frames. The framing logic 630 is operably coupled to an encoder 640, which for the illustrated embodiment is in the form of an 8b/10b encoder, which receives each data frame from the framing logic 630, and performs 8b/10b encoding on the data frames. The result of the 8b/10b encoding is a sequence of encoded data symbols comprising a symbol interval (SI) of 10 unit intervals (UIs). The encoded data symbols are then provided to parallel-to-serial (PAR-2-SER) logic 650, which generates a serial data burst comprising a synchronisation pattern, a start of frame section, a payload section comprising the encoded data frame, and an end of frame section. The data burst is then provided to a line driver 615, which transmits the data burst over the interface 605, which for the illustrated embodiment comprises a differential transmit path (TxDataP line 611, TxDataN line 612).

The interface logic 610 further comprises dither logic 655 arranged to receive a unit interval (UI) timing signal 622, and to offset a transition between a sleep or stall state and a start of a burst of data by integer multiples of unit intervals. For the illustrated embodiment, the dither logic 655 forms a part of the parallel to serial logic 650, and is arranged to generate an SI timing signal 665 substantially synchronised to the offset transition between the sleep/stall state and a start of a burst of data, and subsequent SI boundaries, and to provide the SI timing signal 665 to other components within the interface logic 610. Thus, for the illustrated embodiment, the SI timing signal 665 is provided to each of the framing logic 630 and encoding logic 640, such that each of these logic elements is substantially synchronised to the SI timing signal 665. The parallel to serial logic 650 is further provided with a UI timing signal 622, with which the provision of individual data units (e.g. bits) to the line driver 615 is synchronised.

Figure 7:
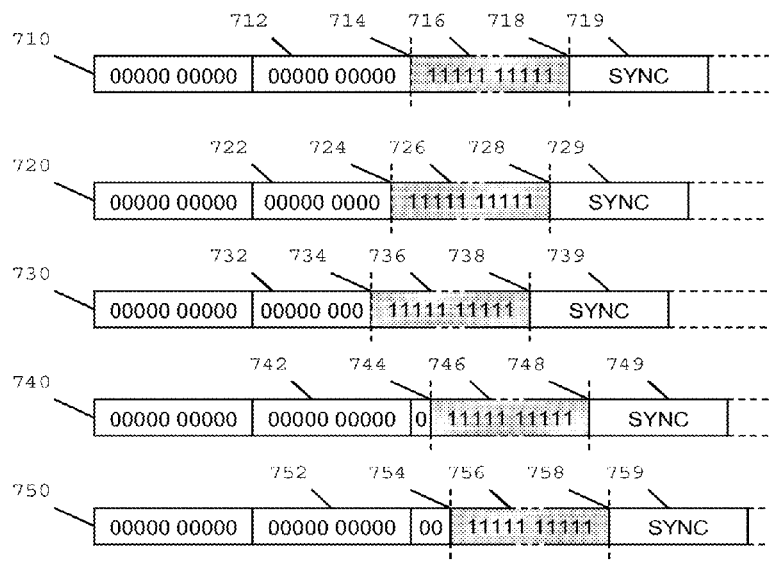
FIG. 7 illustrates examples of transitions between a sleep/stall state and a start of a burst of data.

FIG. 7 illustrates examples of transitions between the sleep/stall state and a start of a burst of data to which offsets have been applied by the interface logic 610 of FIG. 6. As will be appreciated, for a MIPI developed M-PHY interface configured in DigRF mode, prior to the synchronisation pattern at the start of each data burst, the interface 605 is put into a PREPARE state. The purpose of the prepare state is to indicate a zero to one transition. Therefore, during sleep/stall states, the transmit path is held 'low' (e.g. a zero value), and in PREPARE it is held high for N SI periods.

A traditional transition is illustrated at 710, wherein a transition between a stall state 712 and a prepare state 716 is substantially aligned with a default SI boundary 715, for example an SI boundary aligned with a previously transmitted data burst. As a result, the start of a synchronisation pattern 719 of the data burst to be transmitted, and thereby the start of the data burst itself, is also aligned with a default SI boundary 718. Accordingly, the SI boundaries with which the symbols within the data burst to be transmitted are aligned correspond to those of the previously transmitted data burst, creating SI boundary repetition through successive data bursts, exacerbating the EMI caused thereby.

A first example of a transition generated by the interface logic 610 is illustrated at 720. A transition between a stall state 722 and a prepare state 726 is 'negatively' offset by one UI, and an offset SI boundary 724 is accordingly synchronised with the offset transition. As a result, the start of a synchronisation pattern 729 of the data burst to be transmitted, and thereby the start of the data burst itself, is aligned with an SI boundary out of synch by one UI with the SI boundary of the previously transmitted data burst. Accordingly, the repetitiveness of successive bursts may be substantially interrupted from one burst to the next burst, thereby significantly reducing an occurrence of frequency spurs at cellular bands within the EMI profile.

A second example of a transition generated by the interface logic 610 is illustrated at 730. In this example, the transition between a stall state 732 and a prepare state 736 is 'negatively' offset by two UIs, and an offset SI boundary 724 is accordingly synchronised with the offset transition. Further examples of transitions generated by the interface logic 610 are illustrated at 740 and 750 respectively. In these two further examples, the transitions between stall states 742, 752 and prepare states 746, 756 respectively are each 'positively' offset by one UI and two UIs respectively, and offset SI boundaries 734, 744 are accordingly synchronised with the respective offset transitions.

Referring back to FIG. 6, the dither logic 655 may be arranged to offset the transition between the sleep/stall state and the start of a burst of data by a substantially random multiple of unit intervals. Alternatively, the dither logic 655 may be arranged to offset the transition between the sleep/stall state and the start of the burst of data in accordance with a predetermined offset sequence.

Figure 8:
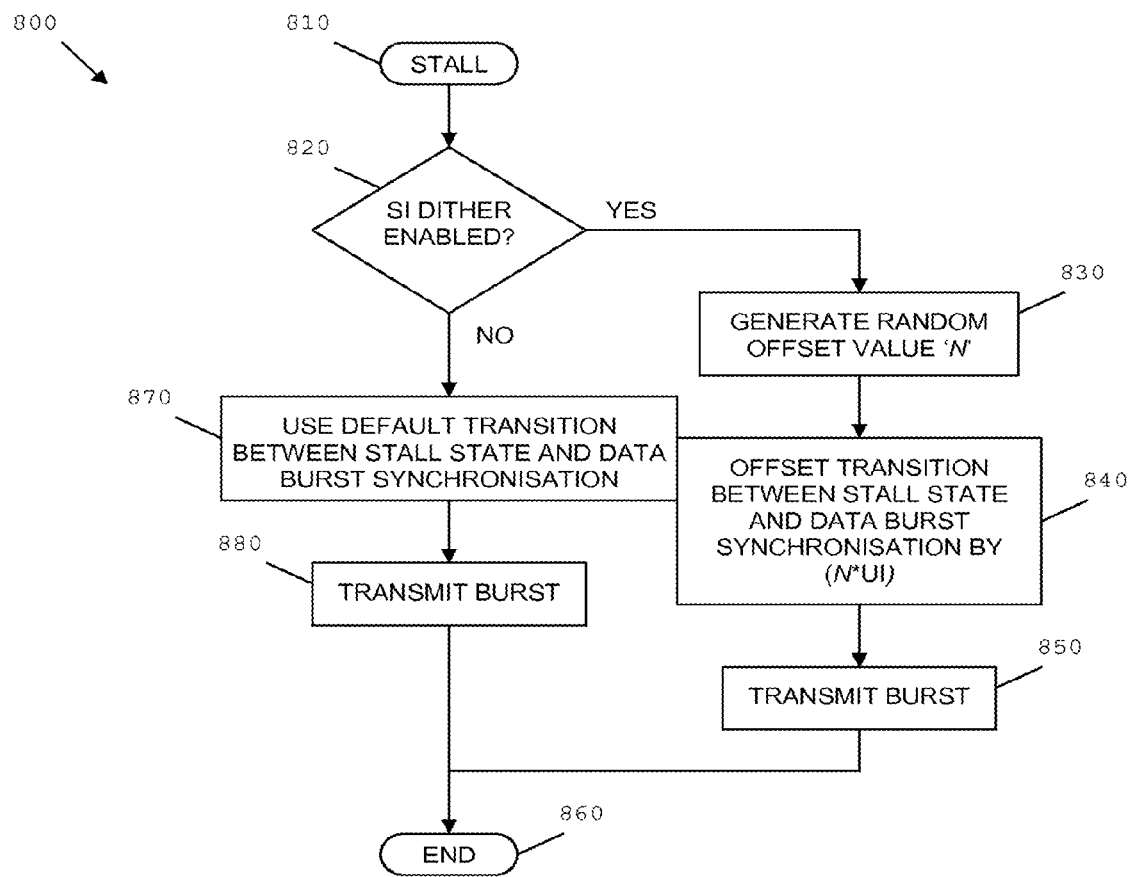
FIG. 8 illustrates a simplified flowchart of an example of a method for transmitting a burst of data across an interface.

Referring now to FIG. 8, there is illustrated an example of a simplified flowchart 800 of a method for transmitting a burst of data across an interface according to some embodiments of the present invention. The method starts at step 810 with a stall (or sleep) mode between a previous data burst and the burst of data to be transmitted across the interface. Next, in step 820, it is determined whether symbol interval (SI) dithering is enabled.

If it is determined that SI dither is enabled, the method moves to step 830, where an offset value 'N' is generated. For the illustrated embodiment, a substantially random offset value is generated. However, an offset value corresponding to a predetermined offset sequence may alternatively be generated. A transition between the stall (or sleep) state and a synchronisation pattern of the data burst to be transmitted across the interface is then offset by N*UI in step 840. The data burst is then transmitted in step 850, and the method ends at step 860.

Referring back to step 820, if it is determined that the SI dither is not enabled, the method moves to step 870, were a default transition between the stall state and the data burst synchronisation is used. Next, in step 880, the data burst is transmitted, and the method ends at step 860.

In the foregoing specification, the invention has been eluciated with reference to specific examples of embodiments of the invention. It will, however, be evident that various modifications and changes may be made therein without departing from the broader spirit and scope of the invention as set forth in the appended claims. For example, the connections may be any type of connection suitable to transfer signals from or to the respective nodes, units or devices, for example via intermediary devices. Accordingly, unless implied or stated otherwise the connections may for example be direct connections or indirect connections.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Thus, it is to be understood that the architectures depicted herein are merely provided by way of example, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the functionality described herein may comprise software, for example, from computer readable media or other media on other computer systems. Such computer readable media may be permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

What is claimed is:

1. A method for transmitting data across an interface, the method comprising:
   determining a first default symbol interval boundary;
   transmitting a first burst of data across the interface at a time based upon the first default symbol interval boundary;
   receiving a unit interval timing signal;
   receiving a symbol interval value;
   dividing the unit interval timing signal by the received symbol value to generate a symbol interval timing signal;
   determining a second default symbol interval boundary;
   transmitting a second burst of data across the interface, wherein the start of the second burst of data is aligned with the second default symbol interval boundary based on a start of the symbol interval timing signal in the second default symbol interval boundary;
   determining a third default symbol interval boundary, the time between the first and second default symbol interval boundaries being the same as the time between the second and third default interval boundaries;
   determining an offset based on a unit interval of a fixed amount of time;
   applying the offset to the third default symbol interval boundary at a start of a burst of data; and
   transmitting a third burst of data across the interface, wherein the start of the third burst of data is aligned with the offset and not aligned with the third default symbol interval boundary.

2. The method of claim 1 wherein the offset is calculated based on (+/−N*UI), where UI equals the unit interval of the fixed amount of time, and N equals (K−1), where K equals a number of unit intervals in one symbol interval.

3. The method of claim 1 further comprising:
   applying an offset to the symbol interval timing signal before the start of a burst of data.

4. The method of claim 1 wherein a random offset determines the start of the second burst of data.

5. The method of claim 1 further comprising:
offsetting a transition between a sleep/stall state and a start of a burst of data by integer multiples of a unit interval of the first signal.

6. A semiconductor device comprising: an interconnect;
divider circuit to receive a unit interval timing signal, to receive a symbol interval value, and to divide the unit interval timing signal by the received symbol value to generate the symbol interval timing signal; and
interface circuit coupled to the interconnect, the interface circuit to determine a first default symbol interval boundary, to transmit a first burst of data across the interconnect at a time based upon the first default symbol interval boundary, to determine a second default symbol interval boundary, to transmit a second burst of data that is aligned with the second default symbol interval boundary based on a start of the symbol interval timing signal in the second default symbol interval boundary, to determine a third default symbol interval boundary, the time between the first and second default interval boundaries being the same as the time between the second and third default interval boundaries, to determine an offset based on a unit interval of a fixed amount of time, to apply the offset to the third default symbol interval boundary at a start of a burst of data, and to transmit a third burst of data that is aligned with the offset and not aligned with the third default symbol interval boundary.

7. The semiconductor device of claim 6 wherein the interface circuit includes: a data storage to store data received at the interface circuit; and a line driver coupled to the data storage and to the interconnect, the line driver to transmit the data stored in the data storage in the bursts.

8. The semiconductor device of claim 6 wherein the interface circuit is arranged to apply a random offset to a default symbol interval boundary before the start of a burst of data.

9. The semiconductor device of claim 6 wherein the interface circuit is arranged to apply an offset to a default symbol interval boundary before the start of a burst of data in accordance with an offset sequence.

10. The semiconductor device of claim 6 wherein the interface logic circuit comprises: timing circuit to generate a symbol interval timing signal in accordance with which the transmission of each burst of data is aligned, and the timing circuit further to apply an offset to the symbol interval timing signal before the start of a burst of data.

11. The semiconductor device of claim 6 wherein the timing circuit further comprises: offset generation circuit to generate an offset value, wherein the offset value is utilized to apply the offset to a default symbol interval value, the resulting symbol interval value being provided to the divider circuit for generating the symbol interval timing signal.

12. The semiconductor device of claim 6 wherein the interface circuit comprises: dither circuit to receive the unit interval timing signal, and to offset a transition between a sleep/stall state and a start of a burst of data by integer multiples of unit intervals.

13. The semiconductor device of claim 6 wherein the offset is calculated based on (+/−N*UI), where UI equals the unit interval of the fixed amount of time, and N equals (K−1), where K equals a number of unit intervals in one symbol interval.

14. A non-transitory computer-readable storage element comprising executable program code for programming interface logic, the computer program product comprising program code for:
determining a first default symbol interval boundary;
transmitting a first burst of data across the interface at a time based upon the first default symbol interval boundary;
receiving a unit interval timing signal;
receiving a symbol interval value; and
dividing the unit interval timing signal by the received symbol value to generate a symbol interval timing signal;
determining a second default symbol interval boundary;
transmitting a second burst of data across the interface, wherein the start of the second burst of data is aligned with the second default symbol interval boundary based on a start of the symbol interval tinning signal in the second default symbol interval boundary;
determining a third default symbol interval boundary, the time between the first and second default symbol interval boundaries being the same as the time between the second and third default interval boundaries;
determining an offset based on a unit interval of a fixed amount of time;
applying the offset to the third default symbol interval boundary at a start of a burst of data; and
transmitting a third burst of data across the interface, wherein the start of the third burst of data is aligned with the offset and not aligned with the third default symbol interval boundary.

15. The non-transitory computer-readable storage element of claim 14 further wherein the
offset is calculated based on (+/−N*UI), where UI equals the unit interval of the fixed amount of time, and N equals (K−1), where K equals a number of unit intervals in one symbol interval.

16. The non-transitory computer-readable storage element of claim 14 wherein a random offset determines the start of the second burst of data.

17. The non-transitory computer-readable storage element of claim 14 further comprising program code for:
generating an offset value, wherein the offset value is utilized to apply the offset to a default symbol interval value, the resulting symbol interval value being provided to a divider logic for generating the symbol interval timing signal.

* * * * *